(12) United States Patent
Hjelmberg et al.

(10) Patent No.: US 9,656,200 B2
(45) Date of Patent: May 23, 2017

(54) FABRIC FILTER SYSTEM AND METHOD FOR CLEANING THE SAME

(71) Applicant: ALSTOM Technology Ltd, Baden (CH)

(72) Inventors: Anders Erik Martin Hjelmberg, Vaxjo (SE); Per Robert Moestam, Vaxjo (SE)

(73) Assignee: Geneal Electric Technology GmbH, Baden (CH)

( * ) Notice: Subject to any disclaimer, the term of this patent is extended or adjusted under 35 U.S.C. 154(b) by 48 days.

(21) Appl. No.: 14/631,116

(22) Filed: Feb. 25, 2015

(65) Prior Publication Data

US 2015/0238890 A1    Aug. 27, 2015

(30) Foreign Application Priority Data

Feb. 26, 2014    (EP) ..................................... 14156720

(51) Int. Cl.
*B01D 46/00*    (2006.01)
*B01D 46/04*    (2006.01)
*B01D 46/02*    (2006.01)

(52) U.S. Cl.
CPC ........... *B01D 46/04* (2013.01); *B01D 46/002* (2013.01); *B01D 46/0068* (2013.01); *B01D 46/023* (2013.01)

(58) Field of Classification Search
CPC .... B01D 46/002; B01D 46/023; B01D 46/04; B01D 46/00; B01D 46/02; B01D 46/0067–46/0071

USPC ........... 55/301–303; 95/26, 278–280; 96/26, 96/427
See application file for complete search history.

(56) References Cited

U.S. PATENT DOCUMENTS

| 4,264,282 | A | * | 4/1981 | Crago | ................... F04C 29/066 181/202 |
| 4,283,208 | A | | 8/1981 | Fernando | |
| 4,624,689 | A | * | 11/1986 | Volk | ................... B01D 46/0005 55/282.5 |
| 2012/0137890 | A1 | * | 6/2012 | Koyama | ............ B01D 46/0041 96/233 |

FOREIGN PATENT DOCUMENTS

| DE | 35 37 226 A1 | 4/1987 |
| EP | 2 602 016 A1 | 6/2013 |

(Continued)

*Primary Examiner* — T. Bennett McKenzie
(74) *Attorney, Agent, or Firm* — GE Global Patent Operation; Rita D. Vacca

(57) ABSTRACT

The invention relates to a fabric filter system, having a first fabric filtering device in the form of elongated tubular fabric bag; a first gas tank for providing compressed gas; a first pulsing gas duct fluidly connected between the first fabric filtering device and the first gas tank through a first pulsing valve for cleaning the first fabric filtering device. The fabric filter system further includes a second gas tank for providing compressed gas. The second gas tank is fluidly connected with the first gas tank through a control valve. The first pulsing valve is opened to introduce the compressed gas into the first filtering device for cleaning when the control valve remains open. The control valve is closed after a predetermined time. A method for cleaning the fabric filter system is disclosed.

14 Claims, 1 Drawing Sheet

(56) References Cited

FOREIGN PATENT DOCUMENTS

| EP | 2626122 A1 | 8/2013 |
|----|------------|--------|
| WO | 93/13845 A1 | 7/1993 |
| WO | 94/12264 A1 | 6/1994 |
| WO | 97/26976 A1 | 7/1997 |

* cited by examiner

FABRIC FILTER SYSTEM AND METHOD FOR CLEANING THE SAME

CROSS-REFERENCE TO RELATED APPLICATIONS

This application claims priority to European application 14156720.6 filed Feb. 26, 2014, the contents of which are hereby incorporated in its entirety.

TECHNICAL FIELD

The present invention relates to fabric filter system and a method for cleaning the fabric filter system.

BACKGROUND

Fabric filters are frequently used in gas cleaning systems. Such fabric filters typically include a number of filter bags where gas may enter while particles or dust entrained in the gas are stopped by the filter fabric and end up on the outside of the filter bags. When such a fabric filter has been in use for a while, the outside surfaces of the filter bags are more or less covered with particles or dust and the filter bags then need to be cleaned in order to maintain a proper passage of gas through the fabric. The cleaning of the filter bags may take place by providing a pulse of compressed air stored in a tank to the inside of the filter bags to quickly stretch the fabric thereby "shaking off" the particles attached to the outside surfaces of the filter bags. In order to be able to provide the pulses of compressed air to the filter bags, a valve arrangement may be provided. The pulses have the function first to shake the bags. Secondly the pulse is to provide a gas flow in the opposite direction of the flue gas flow. The reversed flow serves to blow particles through the filter media and also transport the particles away from the filter material in the opposite direction of the flue gas flow. The third function of the pulse is to provide soft landing. Soft landing is that the filter material should return to the cage in a controlled manner and not hit the cage too hard. Soft landing is a means to both extend the bag life time and decrease emissions. The first objective is achieved by sizing the pressure tank large enough (APEX, investment cost) to maintain proper tank pressure during fulfillment of the first and second objective. To meet the second and third objective the valve opening time is prolonged. The prolonged opening time increases the operational cost.

Current sizing of the air volume needed for cleaning is based on the area of fabric for the number and length of bags that should be cleaned by one valve. By emptying the tank, soft landing is achieved. This will consume the whole tank volume (end pressure after emptying the tank is approximately 0.5 bar overpressure). To get higher bag pulse cleaning pressure tank volume can be increased. Increasing tank volume increases cleaning performance but introduces significant cost increase in both investment and operational cost. Increasing tank volume gives also longer valve opening time to achieve a soft landing, which may be more soft than needed. But with current deign and control of flow, the air consumption will increase, causing higher cost.

A method for cleaning the filter bags of a bag-filter installation is disclosed in EP 0670749 A1, where the filter bags are arranged in a plurality of rows and the dust content of the filtered gas is monitored by means of a monitoring unit, cleaning is carried out by blowing a pressure medium into the filter bags. The pressure medium is blown into the filter bags row by row, the filter bags in one and the same row being cleaned simultaneously, and the rows being successively cleaned at a time interval exceeding the time it takes for conveying the filtered gas from the cleaned row to the monitoring unit.

A method and apparatus for cleaning the cloth in fabric filters is disclosed in WO 1993013845 A1, where an apparatus for cleaning filter bags by reverse flushing of the filter bags with a gas is proposed, which filter bags are arranged in sections comprising one or more filter bags, which sections are connected to the cleaning apparatus by ducts which are arranged in a circle around the apparatus. The apparatus comprises a circular, stationary port tube having ports disposed at each of the ducts, a rotating nozzle tube having a nozzle, which nozzle tube is disposed on the inside of the port tube, a venturi/ejector provided on the outside of the port tube and connected with the nozzle tube by means of an arm, which nozzle tube and ventur/ejector are adapted for stepwise rotation with the aid of an advancing means. There is also described a method which utilizes the apparatus.

A device for cleaning filter elements is disclosed in EP 0891215 B1, where the device for cleaning filter elements, such as filter bags, having upper open ends, in a filter installation for filtering of polluted gas. The gas passing, during operation, from the outside and through said filter elements, in which installation filter elements are juxtaposed in a plurality of essentially parallel rows. The device comprises an essentially horizontal distribution pipe, which extends essentially in parallel with the rows of filters elements and is adapted to be connected to a pressure medium source via a valve. The device further comprises a plurality of nozzle elements, which are connected to the distribution pipe. The nozzle elements are adapted to direct pressure medium pulses (P) into the upper open ends of the filter elements in at least two juxtaposed rows of filter elements.

A filtration apparatus for removing entrained dust particles from a gas stream is disclosed in U.S. Pat. No. 4,283,208 A, wherein the apparatus comprises a housing having an inlet port for dust entrained gas and an outlet port for the exhaust of clean gas therefrom, an apertured tube sheet intermediate the inlet and outlet ports arranged to divide the housing into inlet and outlet sections, a plurality of porous filter bags each having an open end and a closed end with the open end thereof attached to the tube sheet around each aperture thereof to permit the flow of clean gas therethrough while retaining dust particles on the surface of the filter, cleaning means for said filter bags comprising a linear force electromagnetic motor having oppositely extending slider rods connected to said filter bags so as to move horizontally to shake each filter bag, a source of electric current connected to the linear force motor, and means for controlling the current being supplied to the linear force motor to modulate the frequency and amplitude of movement of the slider rods to vary the cleaning effect of said cleaning means.

SUMMARY

It is an object of the present invention is to provide a fabric filter system which may keep the tank pressure constantly high during the pulsing phase, and save operation cost at the same time.

This object is obtained by a fabric filter system, comprising a first fabric filtering device in the form of elongated tubular fabric bag; a first gas tank for providing compressed gas; a first pulsing gas duct fluidly connected between the first fabric filtering device and the first gas tank through a first pulsing valve for cleaning the first fabric filtering device; the fabric filter system further comprises: a second gas tank for providing compressed gas, wherein the second gas tank is fluidly connected with the first gas tank through a control valve, wherein the first pulsing valve is opened to introduce the compressed gas into the first filtering device for cleaning when the control valve remains open; and the control valve is closed after a predetermined time.

According to one example embodiment of the present invention, the fabric filter system further comprises: a second fabric filtering device in the form of elongated tubular fabric bag; a second pulsing gas duct fluidly connected between the second fabric filtering device and the second gas tank through a second pulsing valve for cleaning the first fabric filtering device.

According to one example embodiment of the present invention, the predetermined time ranges within 2 ms to 2000 ms.

According to one example embodiment of the present invention, the predetermined time ranges within 20 ms to 500 ms.

A method for cleaning a fabric filter system, where the fabric filter system comprises: a first fabric filtering device in the form of elongated tubular fabric bag; a first gas tank for providing compressed gas; a first pulsing gas duct fluidly connected between the first fabric filtering device and the first gas tank through a first pulsing valve for cleaning the first fabric filtering device; a second gas tank for providing compressed gas, wherein the second gas tank is fluidly connected with the first gas tank through a control valve, the method comprises steps of: introducing the compressed gas into the first and second gas tank with the control valve open; opening the first pulsing valve to introduce the compressed gas into the first filtering device for cleaning when the control valve remains open; closing the control valve after a predetermined time.

According to one example embodiment of the present invention, the method further comprises step of: opening the second pulsing valve to introduce the compressed gas into the second filtering device for cleaning alternatively with the step of opening the first pulsing valve.

According to one example embodiment of the present invention, the predetermined time ranges within 2 ms to 2000 ms.

According to one example embodiment of the present invention, the predetermined time ranges within 20 ms to 500 ms.

With the structure of the fabric filter system and the operation process according to the present invention, a higher bag pulse cleaning pressure may be established compared with the conventional structure with only one gas tank. At the same time, cleaning can be optimized over bag life time by controlling both the pressure and air volume for cleaning. This may reduce emission but also increase bag life time, and reduce the operation cost.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which.

DETAILED DESCRIPTION

Figure 1:
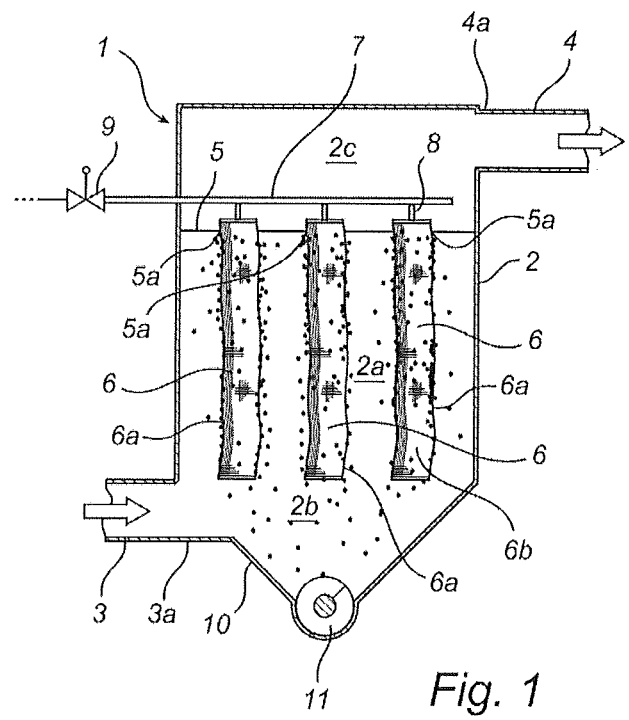
FIG. 1 shows a schematic view of the basic structure of a fabric filter system according to one embodiment of the present invention.

FIG. 1 is a schematic side cross sectional view of a fabric filter system 1. The fabric filter system 1 comprises a housing 2. Duct 3 is a gas inlet into interior 2a of housing 2, for a gas from which particulate materials, such as dust, is to be removed. Duct 3 is fluidly connected at a connection 3a or integrally formed with a lower portion 2b of the housing 2. Duct 4 is a cleaned gas outlet from interior 2a connected at a connection 4a or integrally formed with an upper portion 2c of the housing 2. A horizontal plate 5 is arranged in interior 2a of the housing 2 between ducts 3 and 4. A fabric filtering device in the form of elongated tubular fabric bags 6 is removably attached in opening 5a in the plate 5. In practical application, there are a plurality of fabric filtering devices are provided to improve filtering efficiency. Typically, a fabric filter system 1 may comprise 2 to 25 000 such fabric bags 6. In operation, dust particle loaded gas, e.g., a flue gas from a combustion facility, enters the lower portion 2b of the housing 2 via the duct 3. The gas then passes through the fabric of the bags 6 and into the interior 6a of the bags 6, while the dust particles are collected on the outside surface 6b of the bags 6, or to some extent within the filter material of the bags 6. Then, cleaned gas flows from the interior 6a of the bags 6, through an opening 5a of the plate 5 to exit the fabric filter system 1 via the duct 4.

Periodically, it is necessary to remove collected dust particles from the outside surface 6b of the bags 6. A pulsing gas duct 7 is arranged in the upper portion 2c of the fabric filter system 1. The pulsing gas duct 7 is provided with one pulsing nozzle 8 for each of the openings 5a with attached bags 6. The pulsing gas duct 7 is connected to a pulsing valve 9 fluidly connected to a first gas tank 20 (shown in FIG. 2) for providing compressed gas, such as pressurized air. That is, the first pulsing gas duct 7 is fluidly connected between the first fabric filtering device and the first gas tank 20 through a first pulsing valve 9 for cleaning the first fabric filtering device. The compressed gas typically has an absolute pressure of 2-6 bar, for example, to be suitable for cleaning the outside surface 6b of bags 6.

When it has been determined that it is suitable to remove collected dust particles from the outside surface 6b of bags 6, such determination being based on, for example, a certain time having elapsed since the last removal of dust particles, or a certain pressure drop in gas flow as measured between the duct 3 and the duct 4, being reached, the valve arrangement 9 is opened for a short period of time, typically a period of time of 150 to 500 ms. The opening of the first pulsing valve 9 for the short period of time results in a short pulse of gas flowing through interior of a pulse pipe, to fluidly connected pulsing gas duct 7 and the respective fluidly connected pulsing nozzles 8, into the interior 6a of the bags 6. As an effect of such pulse of gas, the bags 6 expand rapidly, causing most, if not all, of the dust collected on the outside surface 6b thereof to be released. Such released dust falls downwardly into a hopper 10 of the housing 2. Hence, the duct 7, the nozzles 8, the first pulsing valve 9 and the first tank 20 form a cleaning system of the fabric filter 1. Occasionally the dust is removed from the hopper 10 by means of, for example, a screw 11.

Figure 2:
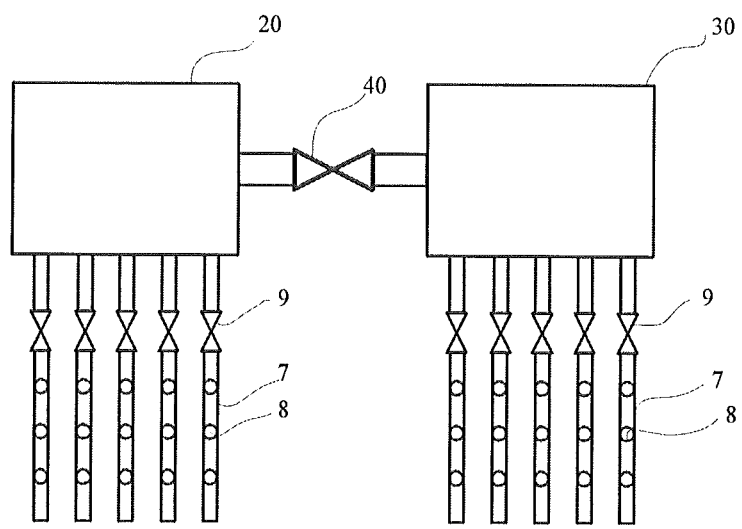
FIG. 2 shows a plan view of the fabric filter system according to one example embodiment of the present invention.

FIG. 2 shows a plan view of the fabric filter system 1 according one example embodiment of the present invention. As shown in FIG. 2, the fabric filter system 1 comprises a first gas tank 20 for providing compressed gas, and a second gas tank 30 for providing compressed gas. The second gas tank 30 is fluidly connected with the first gas tank 20 through a control valve 40. During operation of the fabric filter system 1, the compressed gas is introduced into the first and second gas tank 20, 30 with the control valve 40 open. As cleaning operation of the fabric filter system 1 is required, with the control valve 40 remaining open, the first pulsing valve 9 connected with the first gas tank 20 is opened. After a predetermined time, such as 2 ms to 2000 ms, preferably 20 ms to 500 ms, more preferably 100 ms to 200 ms, more preferably, 150 ms, in which the pulsing pressure in the nozzle pipe 7 reaches maximum, the control valve 40 is closed. As one example embodiment of the present invention, the control valve 40 is closed when the first pulsing valve 9 remains open. Then, the first gas tank 20 is emptied to a relative low level, such as approximate 0.5 bar, achieving soft landing. With the structure of the fabric filter system 1 and the operation process, a higher bag pulse cleaning pressure may be established compared with the conventional structure with only one gas tank. At the same time, cleaning can be optimized over bag life time by controlling both the pressure and air volume for cleaning. This may reduce emission but also increase bag life time, and reduce the operation cost.

As one example embodiment of the present invention, the pulsing gas duct 7 is connected to a pulsing valve 9 fluidly connected to the second gas tank 30 (shown in FIG. 2) for providing compressed gas, and the pulsing gas duct 7 is provided with one pulsing nozzle 8 for each of the openings 5a with attached bags 6. As an example similar to the configuration of the first gas tank 20, a plurality of fabric filtering devices are provided to improve filtering efficiency. In this embodiment, the first and second gas tank 20, 30 function similarly. During operation, the first and second gas tank 20, 30 may be alternatively operated by controlling the pulsing valves 9 connected with them respectively to alternatively open. With this configuration, the capacity of the fabric filter system 1 is enlarged.

As an alternative embodiment that is not shown, the second gas tank 30 may not connect with pulsing gas ducts 7 and remain only a simple gas tank. With this configuration, the structure of the fabric filter system 1 is simplified with the technical benefit of the present invention.

As an alternative embodiment that is not shown, the second gas tank 30 may be shaped identical with the first gas tank 20. Alternatively, the second tank 30 may be smaller or larger than the first gas tank 20.

In an embodiment, the fabric filter system comprises a first fabric filtering device in the form of elongated tubular fabric bag; a first gas tank for providing compressed gas; a first pulsing gas duct fluidly connected between the first fabric filtering device and the first gas tank through a first pulsing valve for cleaning the first fabric filtering device. The fabric filter system further comprises:
a second gas tank for providing compressed gas, wherein the second gas tank is fluidly connected with the first gas tank through a control valve while dividing the compressed gas volume into the first and the second tanks,
wherein
the control valve is opened to connect the first gas tank to the second gas tank sizing an overall volume equivalent to the first and second gas tanks to obtain required pressure of the compressed gas to shake the first fabric filtering device via the first pulsing valve which is opened to introduce the compressed gas from the first gas; and
the control valve is closed after a predetermined time to isolate the first gas tank from the second gas tank sizing the overall volume equivalent to the first gas tank to decrease the compressed gas volume, while the first pulsing valve remains opened until the first gas tank is emptied to a relative low level pressure, achieving soft landing of the first fabric filtering device.

In an embodiment of the method for cleaning a fabric filter system, where the fabric filter system comprises a first fabric filtering device in the form of elongated tubular fabric bag; a first gas tank for providing compressed gas; a first pulsing gas duct fluidly connected between the first fabric filtering device and the first gas tank through a first pulsing valve for cleaning the first fabric filtering device; a second gas tank for providing compressed gas, wherein the second gas tank is fluidly connected with the first gas tank through a control valve, the method comprises steps of:
introducing the compressed gas into the first and second gas tank with the control valve open sizing an overall volume equivalent to the first and second gas tanks to obtain required pressure of the compressed gas;
opening the first pulsing valve to introduce the compressed gas into the first filtering device for cleaning when the control valve remains open;
closing the control valve after a predetermined time while the first pulsing valve remains opened until the first gas tank is emptied to a relative low level pressure, achieving soft landing of the first fabric filtering device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fabric filter system, comprising:
a first fabric filtering device in the form of an elongated tubular fabric bag;
a first gas tank configured to provide compressed gas;
a first pulsing gas duct fluidly connected between the first fabric filtering device and the first gas tank with a first pulsing valve arranged in the first pulsing gas duct between the first fabric filtering device and the first gas tank for compressed gas flow from the first gas tank through the first pulsing valve and the first pulsing gas duct for cleaning the first fabric filtering device;
a second gas tank configured to provide compressed gas;
a second pulsing gas duct fluidly connected between a second fabric filtering device and the second gas tank with a second pulsing valve arranged in the second pulsing gas duct between the second fabric filtering device and the second gas tank for compressed gas flow from the second gas tank through the second pulsing valve and the second pulsing gas duct for cleaning the second fabric filtering device; and
a control valve arranged between the first gas tank and the second gas tank thereby fluidly connecting the first gas tank and the second gas tank when the control valve is opened, and fluidly isolating the first gas tank from the second gas tank when the control valve is closed;

wherein the first pulsing valve is configured to be opened to introduce the compressed gas into the first fabric filtering device via the first pulsing gas duct to clean the first fabric filtering device while the control valve fluidly connected to the second gas tank remains open for a predetermined time before closing.

2. The fabric filter system according to claim 1, wherein the second fabric filtering device is in the form of an elongated tubular fabric bag, and the second pulsing gas duct is fluidly connected between the second fabric filtering device and the second gas tank with the second pulsing valve arranged in the second pulsing gas duct between the second fabric filtering device and the second gas tank for compressed gas flow from the second gas tank through the second pulsing gas duct and the second pulsing valve to clean the second fabric filtering device.

3. The fabric filter system according to claim 1, wherein the predetermined time ranges within 2 ms to 2000 ms.

4. The fabric filter system according to claim 1, wherein the predetermined time ranges within 20 ms to 500 ms.

5. The fabric filter system according to claim 1, wherein the first and second gas tanks are configured such that compressed gas is introduced into the first and second gas tanks when the control valve is open.

6. The fabric filter system according to claim 5, wherein the first pulsing valve is configured such that the first pulsing valve is opened to introduce the compressed gas into the first fabric filtering device for cleaning after the control valve is opened but when the second pulsing valve is closed.

7. The fabric filter system according to claim 1, wherein the control valve is configured to be opened after a first period of time has elapsed since a last time the control valve was previously opened.

8. The fabric filter system according to claim 1, wherein the control valve is configured to be opened when a pre-selected pressure drop in gas flow is measured between an inlet duct and an outlet duct of either the first fabric filter system or the second fabric filter system.

9. The fabric filter system according to claim 8, wherein the inlet ducts are configured such that gas is passable into the first or second fabric filter system via the inlet duct associated therewith such that a first portion of the gas that passed through the inlet duct passes through the first or second fabric filtering device; and the outlet ducts are configured such that the first portion of the gas is output from the first or second fabric filter system after the first portion of the gas is passed through the first or second fabric filtering device.

10. The fabric filter system according to claim 1, wherein the control valve is closed while the first pulsing valve remains open until the first gas tank is emptied to a pre-selected level during cleaning of the first fabric filtering device.

11. The fabric filter system according to claim 10, wherein the pre-selected level of the first gas tank is a level at which the first gas tank has a pressure of 0.5 bar.

12. The fabric filter system according to claim 10, wherein the first and second gas tanks are configured such that compressed gas is introduced into the first and second gas tanks when the control valve is open, the first pulsing valve is configured such that the first pulsing valve is opened to introduce the compressed gas into the first fabric filtering device for cleaning after the control valve is opened, the control valve is configured to be opened when a pre-selected pressure drop in gas flow is measured between the inlet duct of the first fabric filter system and the outlet duct of the first fabric filter system, the inlet duct being configured such that gas is passable into the first fabric filter system via the inlet duct such that a first portion of the gas that passed through the inlet duct passes through the first fabric filtering device, and the outlet duct being configured such that the first portion of the gas is output from the first fabric filter system after the first portion of the gas is passed through the first fabric filtering device.

13. The fabric filter system according to claim 12, wherein the second pulsing valve is configured to be opened to introduce compressed gas into the second fabric filtering device for cleaning when the control valve is open and the first pulsing valve is closed.

14. The fabric filter system according to claim 13, wherein the second fabric filter system is configured such that the second pulsing valve is configured to remain open after the control valve is closed until the second gas tank is emptied to a pre-selected level during cleaning of the second fabric filtering device.

* * * * *